US010118259B1

(12) United States Patent
Fonte

(10) Patent No.: US 10,118,259 B1
(45) Date of Patent: Nov. 6, 2018

(54) CORROSION RESISTANT BIMETALLIC TUBE MANUFACTURED BY A TWO-STEP PROCESS

(71) Applicant: ATI PROPERTIES LLC, Albany, OR (US)

(72) Inventor: Matthew V. Fonte, Charlestown, MA (US)

(73) Assignee: ATI PROPERTIES LLC, Albany, OR (US)

( * ) Notice: Subject to any disclaimer, the term of this patent is extended or adjusted under 35 U.S.C. 154(b) by 144 days.

(21) Appl. No.: 14/103,483

(22) Filed: Dec. 11, 2013

Related U.S. Application Data

(60) Provisional application No. 61/735,987, filed on Dec. 11, 2012, provisional application No. 61/819,952, filed on May 6, 2013.

(51) Int. Cl.
  *B23K 31/02* (2006.01)
  *B21B 17/00* (2006.01)
  *B21C 23/22* (2006.01)

(52) U.S. Cl.
  CPC ........... *B23K 31/027* (2013.01); *B21B 17/00* (2013.01); *B21C 23/22* (2013.01)

(58) Field of Classification Search
  CPC ....... B23K 31/027; B21B 17/00; B21C 23/22; B21C 37/00; B21C 37/08; B21C 37/154; C21D 8/10; C21D 8/105; B21D 22/14–22/18
  USPC ...................... 72/208, 214, 67–126
  See application file for complete search history.

(56) References Cited

U.S. PATENT DOCUMENTS

| 627,289 A | 6/1899 | Bennett |
|---|---|---|
| 1,346,188 A | 7/1920 | Fahrenwald |
| 1,365,987 A | 1/1921 | Hadfield et al. |
| 1,384,718 A | 7/1921 | Guy |
| 1,553,825 A | 9/1925 | Lansenberg |
| 1,602,282 A | 10/1926 | Methlin |
| 2,104,319 A | 1/1938 | Dicke |
| 2,222,579 A | 11/1940 | Wolcott |

(Continued)

FOREIGN PATENT DOCUMENTS

| CA | 2224586 A1 | 1/1997 |
|---|---|---|
| CN | 101061248 A | 10/2007 |

(Continued)

OTHER PUBLICATIONS

Evaluation of Alloy 625 Steel Bimetallic Pipe for Petroleum Service; by Dr. Wilhelm et al.; The Minderals, Metals & MAterials Society, 1991; p. 771-791.*

(Continued)

*Primary Examiner* — James S McClellan
*Assistant Examiner* — Peter Iannuzzi
(74) *Attorney, Agent, or Firm* — K&L Gates LLP

(57) ABSTRACT

A method of producing a bimetallic tubular component includes providing a first tubular workpiece having an inner diameter and a second tubular workpiece having an outer diameter. The first and second tubular workpieces have dissimilar cold-working processing parameters. The method further includes diffusion bonding the inner diameter of the first tubular workpiece to the outer diameter of the second tubular workpiece, and flowforming the diffusion bonded tubular workpieces to form the bimetallic tubular component.

7 Claims, 12 Drawing Sheets

(56) References Cited

U.S. PATENT DOCUMENTS

| | | | |
|---|---|---|---|
| 2,392,797 A | 1/1946 | Hackett | |
| 2,541,114 A | 2/1951 | Somes | |
| 2,541,116 A | 2/1951 | Somes | |
| 2,876,095 A | 3/1959 | Dickerson | |
| 2,990,342 A | 6/1961 | Sullivan | |
| 3,017,793 A | 1/1962 | Appel | |
| 3,091,022 A | 5/1963 | Faulkner | |
| 3,516,326 A | 7/1970 | Donner | |
| 3,568,723 A | 3/1971 | Sowards | |
| 3,571,962 A | 3/1971 | Eig | |
| 3,604,102 A | 9/1971 | Boccalari et al. | |
| 3,626,570 A | 12/1971 | Kushnir et al. | |
| 3,660,177 A | 5/1972 | Brown et al. | |
| 3,753,286 A | 8/1973 | Lilly et al. | |
| 3,780,555 A | 12/1973 | Balthazar et al. | |
| 3,798,011 A | 3/1974 | Sharp, Jr. | |
| 3,962,767 A | 6/1976 | Byerley et al. | |
| 3,969,155 A | 7/1976 | McKeighen | |
| 4,028,785 A | 6/1977 | Jackson et al. | |
| 4,161,112 A | 7/1979 | Stump | |
| 4,200,492 A | 4/1980 | Armijo et al. | |
| 4,210,600 A | 7/1980 | Zardi | |
| 4,317,271 A | 3/1982 | Chakravarti | |
| 4,319,121 A | 3/1982 | Yoshida | |
| 4,359,352 A | 11/1982 | Ray et al. | |
| 4,409,881 A | 10/1983 | van der Wielen | |
| 4,411,569 A | 10/1983 | Pizzola | |
| 4,417,459 A | 11/1983 | Tomita | |
| 4,465,524 A | 8/1984 | Dearnaley et al. | |
| 4,478,787 A | 10/1984 | Nadkami et al. | |
| 4,482,398 A | 11/1984 | Eylon et al. | |
| 4,518,111 A | 5/1985 | Hardwick | |
| 4,571,969 A | 2/1986 | Tomita | |
| 4,573,629 A | 3/1986 | Imahashi et al. | |
| 4,609,524 A | 9/1986 | Ferrari | |
| 4,622,080 A | 11/1986 | Wegwerth | |
| 4,638,712 A | 1/1987 | Chawla et al. | |
| 4,669,212 A | 6/1987 | Jackson et al. | |
| 4,690,716 A | 9/1987 | Sabol et al. | |
| 4,747,225 A | 5/1988 | Gstettner et al. | |
| 4,751,044 A | 6/1988 | Hwang et al. | |
| 4,756,677 A | 7/1988 | Hribernik et al. | |
| 4,761,346 A | 8/1988 | Naik | |
| 4,765,174 A | 8/1988 | Cook et al. | |
| 4,819,471 A | 4/1989 | Cook | |
| 4,846,392 A | 7/1989 | Hinshaw | |
| 4,854,148 A * | 8/1989 | Mayer | B21C 37/207 72/283 |
| 4,889,776 A | 12/1989 | Priceman | |
| 4,899,813 A | 2/1990 | Menicatti et al. | |
| 4,903,887 A | 2/1990 | Thrower | |
| 4,911,060 A | 3/1990 | Greenspan et al. | |
| 4,995,548 A | 2/1991 | Wang et al. | |
| 5,004,529 A | 4/1991 | Vishnitsky | |
| 5,056,209 A | 10/1991 | Ohashi et al. | |
| 5,111,990 A | 5/1992 | Thrower et al. | |
| 5,154,780 A | 10/1992 | Premkumar | |
| 5,160,802 A | 11/1992 | Moscri | |
| 5,228,427 A | 7/1993 | Gardner, Jr. | |
| 5,259,547 A | 11/1993 | Hardwick | |
| 5,261,591 A | 11/1993 | Hardwick | |
| 5,285,485 A * | 2/1994 | Rosenbaum | G21C 3/20 148/672 |
| 5,341,719 A | 8/1994 | Bullis et al. | |
| 5,344,508 A | 9/1994 | Gilman et al. | |
| 5,383,228 A | 1/1995 | Armijo et al. | |
| 5,419,791 A | 5/1995 | Folmer | |
| 5,434,897 A | 7/1995 | Davies | |
| 5,469,481 A | 11/1995 | Adamson et al. | |
| 5,470,373 A | 11/1995 | Edelstein et al. | |
| 5,483,563 A | 1/1996 | Herb | |
| 5,517,540 A * | 5/1996 | Marlowe | C22F 1/186 376/409 |
| 5,524,032 A * | 6/1996 | Adamson | G21C 3/06 376/409 |
| 5,558,150 A | 9/1996 | Sponseller | |
| 5,579,988 A * | 12/1996 | Schutz | B23K 20/04 228/186 |
| 5,584,428 A * | 12/1996 | Satoh | B21C 37/06 138/142 |
| 5,620,536 A | 4/1997 | Dahlbäck | |
| 5,649,440 A | 7/1997 | Arnautu et al. | |
| 5,657,659 A | 8/1997 | Yamada | |
| 5,699,955 A | 12/1997 | Shimizu et al. | |
| 5,856,631 A | 1/1999 | Julien | |
| 5,928,799 A | 7/1999 | Sherman et al. | |
| 5,935,351 A | 8/1999 | Sherman et al. | |
| 6,010,669 A | 1/2000 | Miola et al. | |
| 6,038,901 A | 3/2000 | Stein et al. | |
| 6,068,814 A | 5/2000 | Kang et al. | |
| 6,129,795 A | 10/2000 | Lehockey et al. | |
| 6,167,794 B1 | 1/2001 | Kathe | |
| 6,298,764 B1 | 10/2001 | Sherman et al. | |
| 6,318,738 B1 | 11/2001 | Abkowitz et al. | |
| 6,324,831 B1 | 12/2001 | Izadi et al. | |
| 6,350,327 B2 * | 2/2002 | Neill | B23K 9/048 148/521 |
| 6,363,867 B1 | 4/2002 | Tsilevich | |
| 6,386,010 B1 | 5/2002 | Irie et al. | |
| 6,412,684 B1 | 7/2002 | Miola | |
| 6,419,768 B1 | 7/2002 | Tverberg | |
| 6,422,010 B1 | 7/2002 | Julien | |
| 6,464,804 B2 | 10/2002 | Goecmen et al. | |
| 6,523,385 B2 | 2/2003 | Häusler | |
| 6,564,689 B1 | 5/2003 | Billgren | |
| 6,594,936 B1 | 7/2003 | Sniezak et al. | |
| 6,615,702 B1 | 9/2003 | Julien | |
| 6,691,397 B2 | 2/2004 | Chakravarti | |
| 6,810,615 B2 | 11/2004 | Hermanson et al. | |
| 6,880,220 B2 | 4/2005 | Gandy | |
| 6,887,356 B2 | 5/2005 | Ford et al. | |
| 6,908,516 B2 | 6/2005 | Hehmann et al. | |
| 6,913,791 B2 | 7/2005 | Burca et al. | |
| 6,923,900 B2 | 8/2005 | Jones et al. | |
| 6,931,776 B2 | 8/2005 | Wagner et al. | |
| 7,093,340 B2 | 8/2006 | Groll | |
| 7,114,358 B2 | 10/2006 | Lamb | |
| 7,448,243 B1 | 11/2008 | Motsenbocker | |
| 7,482,065 B2 | 1/2009 | Branagan | |
| 7,520,947 B2 | 4/2009 | Kennedy et al. | |
| 7,596,848 B2 | 10/2009 | Urech et al. | |
| 7,601,232 B2 | 10/2009 | Fonte et al. | |
| 7,721,478 B2 | 5/2010 | Withers et al. | |
| 7,765,846 B2 | 8/2010 | Stueckrad et al. | |
| 7,818,986 B1 | 10/2010 | Parker et al. | |
| 7,921,590 B2 | 4/2011 | Briggs et al. | |
| 7,922,065 B2 * | 4/2011 | Sutherlin | B01J 19/02 228/112.1 |
| 7,934,332 B2 | 5/2011 | Briggs | |
| 7,963,202 B1 | 6/2011 | Becker et al. | |
| 8,075,839 B2 | 12/2011 | Srivastava | |
| 8,302,341 B2 | 11/2012 | Fonte | |
| 8,388,890 B2 | 3/2013 | Hilty et al. | |
| 8,418,392 B2 | 4/2013 | Carter et al. | |
| 8,479,549 B1 | 7/2013 | Fonte | |
| 8,618,434 B2 | 12/2013 | Chen et al. | |
| 8,671,609 B2 | 3/2014 | Fonte | |
| 8,681,923 B2 | 3/2014 | Ashida | |
| 8,869,443 B2 | 10/2014 | Fonte | |
| 8,910,409 B1 | 12/2014 | Fonte | |
| 8,973,810 B2 | 3/2015 | Sutherlin et al. | |
| 9,186,726 B2 | 11/2015 | Keane et al. | |
| 9,375,771 B2 | 6/2016 | Fonte et al. | |
| 2002/0121119 A1 | 9/2002 | Baensch et al. | |
| 2003/0019269 A1 | 1/2003 | Rolf | |
| 2004/0105999 A1 | 6/2004 | Abkowitz et al. | |
| 2005/0066801 A1 | 3/2005 | Hermanson et al. | |
| 2005/0076975 A1 | 4/2005 | Lopez et al. | |
| 2005/0194073 A1 | 9/2005 | Hamano et al. | |
| 2005/0279630 A1 | 12/2005 | Fonte | |
| 2006/0027628 A1 * | 2/2006 | Sutherlin | B01J 19/02 228/101 |
| 2006/0288854 A1 | 12/2006 | Witherell et al. | |
| 2007/0059460 A1 | 3/2007 | Abney et al. | |

(56) References Cited

U.S. PATENT DOCUMENTS

| | | | |
|---|---|---|---|
| 2008/0063387 A1 | 3/2008 | Nakamura et al. | |
| 2008/0142268 A1 | 6/2008 | Downton et al. | |
| 2008/0280691 A1 | 11/2008 | Stueckrad et al. | |
| 2009/0217812 A1 | 9/2009 | Whitaker et al. | |
| 2010/0236122 A1* | 9/2010 | Fonte | B21D 22/16 42/76.1 |
| 2012/0031516 A1* | 2/2012 | Yori, III | B21J 5/063 138/103 |
| 2013/0206274 A1 | 8/2013 | Smith et al. | |
| 2014/0087210 A1* | 3/2014 | Keane | B22F 7/02 428/810 |
| 2014/0353291 A1* | 12/2014 | Gould | B23K 11/00 219/78.01 |
| 2015/0048057 A1 | 2/2015 | Wada | |
| 2015/0083284 A1 | 3/2015 | Rawson et al. | |
| 2015/0144681 A1 | 5/2015 | Sutherlin et al. | |
| 2016/0033059 A1 | 2/2016 | Fonte | |

FOREIGN PATENT DOCUMENTS

| | | |
|---|---|---|
| CN | 102330850 A | 1/2012 |
| EP | 0057867 A1 | 1/1982 |
| EP | 0233437 A1 | 8/1987 |
| EP | 0614712 A1 | 9/1994 |
| EP | 0911106 A1 | 4/1999 |
| EP | 0965410 A2 | 12/1999 |
| EP | 1164180 A2 | 12/2001 |
| EP | 1577631 A1 | 9/2005 |
| EP | 1577632 A1 | 9/2005 |
| FR | 1431998 A | 3/1966 |
| GB | 974590 | 11/1964 |
| GB | 1168265 | 10/1969 |
| GB | 1220796 | 1/1971 |
| GB | 1235182 | 6/1971 |
| GB | 1478962 | 7/1977 |
| GB | 2256910 A | 12/1992 |
| JP | S54-46163 A | 4/1979 |
| JP | S54-149012 A | 11/1979 |
| JP | S55-152301 A | 11/1980 |
| JP | S56-68657 A | 6/1981 |
| JP | S56-148486 A | 11/1981 |
| JP | S59-39414 A | 3/1984 |
| JP | S59-185724 A | 10/1984 |
| JP | 60-030588 A1 | 2/1985 |
| JP | 60-238492 A | 11/1985 |
| JP | S62-220212 | 9/1987 |
| JP | S62-224420 A | 10/1987 |
| JP | S63-49082 U | 4/1988 |
| JP | S63-286288 A | 11/1988 |
| JP | S64-2787 A | 1/1989 |
| JP | S64-71582 A | 3/1989 |
| JP | 1-130822 A | 5/1989 |
| JP | H01-152400 A | 6/1989 |
| JP | H2-134485 A | 5/1990 |
| JP | H2-179314 A | 7/1990 |
| JP | H2-228468 A | 9/1990 |
| JP | H2-247302 A | 10/1990 |
| JP | H03-36205 A | 2/1991 |
| JP | H4-182023 A | 6/1992 |
| JP | H5-185248 A | 7/1993 |
| JP | H6-10919 A | 1/1994 |
| JP | H6-27027 A | 4/1994 |
| JP | H6-55076 A | 7/1994 |
| JP | H7-9167 A | 1/1995 |
| JP | H7-27884 A | 1/1995 |
| JP | H07-32167 A | 2/1995 |
| JP | H09-168878 A1 | 6/1997 |
| JP | H10-231267 A | 9/1998 |
| JP | H11-180942 A | 7/1999 |
| JP | 2000-126881 A1 | 5/2000 |
| JP | 2003-1427 A | 1/2003 |
| JP | 2004-243354 A | 9/2004 |
| JP | 2007-217716 A | 8/2007 |
| JP | 2009-30095 A | 2/2009 |
| JP | 2011-045923 A | 3/2011 |
| KR | 10-2009-0052233 A | 5/2009 |
| NE | 6412699 | 10/1965 |
| WO | WO 94/01600 A1 | 1/1994 |
| WO | WO 97/01057 A1 | 1/1997 |
| WO | WO 02/099352 A1 | 12/2002 |
| WO | WO 03/095060 A1 | 11/2003 |
| WO | WO 2004/061159 A2 | 7/2004 |
| WO | WO 2010/073476 A1 | 7/2010 |

OTHER PUBLICATIONS

"Fabrication of copper/aluminum composite tubes by spin-bonding process: experiments and modeling" by Mohammad Sadegh Mohebbi & Abbas Akbarzadeh; INT J Adv Manuf Technol (2011) published online Nov. 11, 2010.*

AISI 1020 Steel, cold rolled date sheet, published by (http://www.matweb.com/search/datasheet_print.aspx?matguid=10b74ebc27344380ab16b1b69f1cffbb).*

Steels, General Properties data sheet, published by (http://www.matweb.com/search/datasheet_print.aspx?matguid=10e1c14130cd4ed6ae64b85723be53af).*

Haynes 625 alloy published by (http://www.haynesintl.com/alloys/alloy-portfolio_/High-temperature-Alloys/HAYNES625Alloy.aspx).*

Alloy 625 Data Sheet.*

Capital Steel & Wire published to (https://www.capitalsteel.net/news/blog/1018-vs-1020-steel-comparison).*

416R Gun Barrel Steel by Next Generation Metals Inc. published to (http://nextgenerationmetals.com/products-page/stainless/416r-gun-barrel-steel/).*

Patent Abstracts of Japan, Pub. No. 05-093249, related to App. No. JP 03-022791, published Apr. 16, 1993.

Patent Abstracts of Japan, Pub. No. 05-093238, related to App. No. 03-273308, published Apr. 16, 1993.

Patent Abstracts of Japan, Pub. No. 58-179592, related to App. No. 57-054316, published Oct. 20, 1983.

Patent Abstracts of Japan, Pub. No. 60-089565, related to App. No. 58-197406, published May 20, 1985.

Patent Abstracts of Japan, Pub. No. 61-291958, related to App. No. 60-131435, published Dec. 22, 1986.

Patent Abstracts of Japan, Pub. No. 07-150556, related to App. No. 05-300081, published Jun. 13, 1995.

"Modernising Urea Plants: The Widening Appeal of Revamps", Fertilizer International, No. 339, Nov. 1994, pp. 28-33.

Bhowmik, "Materials of Construction in Urea Plant and the Areas where Maximum Corrosion Takes Place", Corrosion & Maintenance, Jan.-Mar. 1985, pp. 11-22.

McDowell, Jr., "Corrosion in Urea-Synthesis Reactors", Chemicals and Processes Pub. May 13, 1974, pp. 54-57.

Outlook, vol. 7, No. 1, Winter 1986, published by Teledyne Wah Chang Albany, 6 pages.

Holmes et al., "Welding Zirconium to Titanium" in Outlook, vol. 24, No. 3, Third Quarter 2003, published ATI Wah Chang.

Outlook, "Explosive welding: principles and potentials" and "Key Welding Processes and Parameters for Zirconium and Other Reactive Metals", "Q&A: Working With Ti-45Nb", vol. 15, No. 2, 2nd Quarter 1994, published by Teledyne Wah Chang.

Condliff, "The Production of Zirconium-Lined Titanium—3%Al-2.5%V Pipe and Tube for Industrial Applications", Proceedings of Sixth World Conference on Titanium, France, 1988, pp. 1379-1384.

Tersmeden, "Bimetallic tubing as an answer to process tubing corrosion", Anti-Corrosion Methods and Materials (vol. 44, No. 4, 1997), pp. 269-270.

"Experimental Investigation of the Vapour-Liquid Equilibrium of the Carbon Dioxide-Ammonia-Water System at Urea Synthesis Conditions", Chimia, 33, No. 8, Aug. 1979, pp. 293-299.

Yau, Te-Lin, "Performance of Zirconium and Zirconium Alloys in Organics", J. of Testing and Evaluation, vol. 24, No. 2, Mar. 1996, pp. 110-118.

Miola et al., "Use of Bimetallic Tubes in Urea Strippers", Ammonia Technical Manual, 1996, vol. 36, pp. 254-258.

(56) References Cited

OTHER PUBLICATIONS

Banker and Nobili, "Zirconium Explosion Clad for Cost Effective Process Equipment: Applications, Design, Fabrication", published in Proceedings of 1997 Zirconium/Organics Conference, Wah Chang Corp., Sep. 1997, pp. 71-78.
Outlook, Teledyne Wah Chang Albany, vol. 13, No. 2, Spring 1992, 12 pages.
Outlook, Teledyne Wah Chang, vol. 16, No. 1, 1995, Te-Lin Yau, pp. 1-12.
Nobili et al., "Recent Developments in Characterization of a Titanium-Steel Explosion Bond Interface", published in Proceedings of Reactive Metals in Corrosive Applications Conference, Wah Chang, Albany, OR, Sep. 1999, 15.
Nobili et al., "Continuing Innovation in Zirconium Explosion Clan Manufacturing", presented at Wah Chang Reactive Metal Conference, Sep. 12, 2001, pp. 1-9.
"Zr Outlook", Teledyne Wah Chang Albany, vol. 4, No. 2, Spring 1983, printed from http://www.wahchang.com/WahChang/pages/outlook/html/bkissues/04_02.htm on Apr. 13, 2005, 9 pages.
"Solid State Welding", printed from http://key-to-metals.com/PrintArticle.asp?ID=51 on Apr. 13, 2005, 5 pages.
Booklet No. 5 of 8: Production of Urea and Urea Ammonium Nitrate, European Fertilizer Manufacturers Association, article printed from http://www.efma.org/Publication/BAT%2095/Bat05/section04.asp on Apr. 13, 2005, 15 pages.
"Interface Welding", commercial website pages printed from http://www.interfacewelding.com/ on Apr. 13, 2005, 10 pages.
Tsang S., "Friction Welding", ASM Handbook, vol. 6, ASM International, 1993, pp. 315-317.
Nicholas, E.D., "Radial Friction Welding", ASM Handbook, vol. 6, ASM International, 1993, pp. 318-320.
Elmer et al., "Fundamentals of Friction Welding", ASM Handbook, vol. 6, ASM International, 1993, pp. 150-155.
Satyro et al., "Modeling Urea Processes: A New Thermodynamic Model of Software Integration Paradigm", printed from Online Chemical Engineering Information at cheresources.com, presented at The Chemical Engineers' Resource Page, Aug. 14, 2004, 20 pages.
Lison, R., "Advanced Application, Spin Welding for Special Metals", Industrie Anzeiger Extra, pp. 73-75 (undated).
ASM Committee on Explosion Welding, "Explosion Welding", pp. 705-718 (undated).
Schwartz, M. M., "Metals Joining Manual", McGraw-Hill, New York, 1979, 62 pages.
"White Paper Autofrettage," Maximator Test, LLC, Jul. 2, 2009, 4 pages.
Aguayo et al., "Elastic Stability and Electronic Structure of fcc Ti, Zr, and Hf: A First-principles Study," Physical Review B, vol. 65, 092106, 4 pages, Feb. 2002.
Alegre et al., "Fatigue design of wire-wound pressure vessels using ASME-API 579 procedure," Eng Fail Anal, pp. 1-12, 2009.
Andrews et al., "Hydraulic Testing of Ordnance Components," ASME, vol. 128, pp. 162-167, May 2006.
Burton et al., "Army Materials Research: Transforming Land Combat Through New Technologies," AMPTIAC Quarterly, vol. 8, No. 4, 10 pages, 2004.
Del Corso, "Effect of Cold Drawing & Heat Treating on Powder Metallurgy Processed ASTM F 1537 Alloy 1 & Alloy 2 Barstock," Carpenter Technology Corporation, Reading, PA, 6 pages, 2003.
Gloaguen et al., "Measurement and Prediction of Residual Stresses and Crystallographic Texture Development in Rolled Zircaloy-4 Plates: X-ray Diffraction and the Self-Consistent Model," Acta Materialia, vol. 55, p. 4369-4379, 2007.
Janaki Ram et al., "Microstructure and Wear Properties of LENS@ Deposited medical Grade CoCrMo," J. Mater Sci: Mater Med, vol. 19, pp. 2105-2111, 2008.
Mani Krishna et al, "Microstructural and Textural Developments During Zircaloy-4 Fuel Tube Fabrication," Journal of Nuclear Materials, vol. 383, pp. 78-85, 2008.
Mani-Medrano et al., "Effect of Plastic Deformation on the Isothermal FCC/HCP Phase Transformation During Aging of Co—27Cr—5Mo—0.05C Alloy," Materials Science Forum, vol. 560, pp. 23-28, 2007.
Montero-Ocampo et al., "Effect of Fcc-Hcp Phase Transformation Produced by Isothermal Aging on the Corrosion Resistance of a Co—27CR—5Mo—0.05C Alloy," Metallurgical and Materials Transactions A, vol. 33A, pp. 2229-2235, Jul. 2002.
Opris et al., "Development of Stellite Alloy Composites with Sintering/HIPing Technique for Wear-Resistant Applications," Materials & Design, vol. 28, pp. 581-591, 2007.
Parker et al., "Residual Stresses and Lifetimes of Tubes Subjected to Shrink Fit Prior to Autofrettage," ASME, vol. 125, pp. 282-286, Aug. 2003.
Paul et al., "Hot Working Characteristics of Cobalt in the Temperature Range 600-950° C.," Scripta Materialia, vol. 60, pp. 104-107, 2009.
Perry et al., "The Influence of the Bauschinger Effect on the Yield Stress, Young's Modulus, and Poisson's Ratio of a Gun Barrel Steel," Journal of Pressure Vessel Technology, vol. 128, pp. 179-184, May 2006.
Robertson et al., "Crystallographic Texture for Tube and Plate of the Superelastic/Shape-Memory Alloy Nitinol Used for Endovascular Stents," Wiley InterScience, pp. 190-199, 2004.
Robertson et al., "Effect of Product Form and Heat Treatment on the Crystallographic Texture of Austenitic Nitinol," J. Mater Sci, vol. 41, pp. 621-630, 2006.
Theaker et al., "Development of Crystallographic Texture in CANDU Calandria Tubes," Thirteenth International Symposium, ASTM STP, pp. 445-464, 2002.
Yu et al., "A Comparison of the Tribo-Mechanical Properties of a Wear Resistant Cobalt-Based Alloy Produced by Different Manufacturing Processes," Transactions of the ASME, vol. 129, pp. 586-594, Jul. 2007.
PMF Industries, Understanding Flowforming web archived Oct. 13, 2004 (http://web.archive.org/web/20041013173007/http://www.pmfind.com/Flowforming/Flowforming/Flowforming-6-04.pdf).
Antunes et al., "Influence of Stress State on High Temperature Fatigue Crack Growth in Inconel 718," Fatigue & Fracture of Engineering Materials & Structures, 24 (2001), pp. 127-135.
Koch et al., "Seamless Thin-Walled TiAl6V4 Tubes Manufactured by Flow-Forming Process," Titanium '92, Science and Technology, The Minerals, Metals & Materials Society (1993), pp. 1429-1436.
Rifling by Flow Forming: A New Developed Method for Rifling Barrels, 2007, (http://www.macdor.com/technical_documents/Rifling_by_flow_forming.pdf).
Rifling: Facts, Discussion Forum, and Encyclopedia Article, printed Jun. 16, 2009, (http://www.absoluteastronomy.com/topics/Rifling).
Solicitation/Contract/Order for Commercial Items, Contract No. W15QKN-04-M-0184, Award/Effective Date: Apr. 23, 2004, 2 pages.
Amendment of Solicitation/Modification of Contract, Amendment/Modification No. W15QKN-04-M-0184, Effective Date: Jul. 29, 2004, 3 pages.
Solicitation/Contract/Order for Commercial Items, Contract No. W15QKN-05-P-0123, Award/Effective Date: Mar. 10, 2005, 11 pages.
Solicitation/Contract/Order for Commercial Items, Contract No. W15QKN-05-P-0248, Award/Effective Date: Apr. 21, 2005, 10 pages.
Amendment of Solicitation/Modification of Contract, Amendment/Modification No. W15QKN-05-P-0248, Effective Date: Aug. 22, 2005, 2 pages.
Solicitation/Contract/Order for Commercial Items, Contract No. W15QKN-05-P-0312, Award/Effective Date: Jun. 8, 2005, 12 pages.
Amendment of Solicitation/Modification of Contract, Amendment/Modification No. W15QKN-05-P-0312, Effective Date: Aug. 23, 2005, 2 pages.
Amendment of Solicitation/Modification of Contract, Amendment/Modification No. W15QKN-05-P-0312, Effective Date: Oct. 25, 2005, 2 pages.
Drawings for Contract No. W15QKN-04-M-0184, Release Date: Jul. 7, 2004, 2 pages.

(56) References Cited

OTHER PUBLICATIONS

Drawings for Contract No. W15QKN-04-M-0184, Release Date: Nov. 2, 2004, 2 pages.
DeFries, Richard S., "Hydrostatic Extrusion of 60MM Mortar Tubes," National Technical Information Service, Oct. 1974.
Gourley, Scott R., Mortar Technology, "Special Operations Technology, Online Edition", retrieved from Internet Dec. 12, 2007: http://www.special-operations-technology.com/article.cfm?DocID=2051, pp. 1-6.
Harlow et al., "Development of an Electrochemical Machining Process for Rifling Lined Gun Barrels," Defense Technical Information Center, Dec. 1972, retrieved from Internet: http://stinet.dtic.mil/oai?&verb=getRecord&metadataPrefix=html&identifier=AS0909379, 1 page.
Kim et al., "Effect of Thermo-Mechanical Treatment on Mechanical Properties and Shape Behavior of Ti-(26-28) at % Nb Alloys", Materials Science and Engineering A, Feb. 6, 2006, pp. 839-843.
Lee et al., "Structure-Property Relationship of Cast Ti-Nb Alloys", Journal of Oral Rehabilitation, Department of Materials Science and Engineering, Blackwell Science Ltd., vol. 29, 2002, pp. 314-322.
Powell, G. W., "Evaluation of Alloys for Use in 81-mm Mortar Tubes; Elevated-Temperature Failures," Failure Analysis and Prevention, vol. 11, ASM Handbook, ASM International, 1986, pp. 263-297.
Drennen et al., "Rotary Swaged Rapid-Fire Gun Barrels", Battelle Memorial Institute, 100 pages, Aug. 1972.
Tillack et al., "Heat Treating of Nickel Alloys", adapted from Heat Treating, ASM Handbook, ASM International, vol. 4, pp. 907-912, 1990.
Prevéy, "The Effect of Cold Work on the Thermal Stability of Residual Compression in Surface Enhanced IN718", Lambda Technologies, 20th ASM Materials Solutions Conference & Exposition, 9 pages, Oct. 10-12, 2000.
Frank, "Selection of Age-Hardenable Superalloys", 13 pages, Jun. 2005.
Cammett et al., "The Effect of Shot Peening Coverage on Residual Stress, Cold Work, and Fatigue in a Nickel-Base Superalloy", Lambda Technologies, Proceedings of ICSP 9, pp. 1-6, Sep. 6-9, 2005.
Liu et al., "Study of Residual Stresses in the Barrel Processed by the Radial Forging", 2009 Second International Conference on Information and Computing Science, IEEE Computer Society, pp. 131-134, 2009.
U.S. Appl. No. 14/320,992, filed Jul. 1, 2014.
Chang, O.W., "Zirconium and Titanium Flowformed Products Offer Myriad of Advantages," Outlook, 1.sup.st Quarter, 1999.
Scutti, J. J., "Flowformed Titanium Tubular Products," Advanced Materials & Processes, Jan. 2001.
Klocke, F., et al., "Laser-Assisted Metal Spinning of Advanced Materials," Fraunhofer Institute of Production Technology IPT, pp. 1-5, 2003.
Fonte, V., "Flowforming of Thin-Walled Tubes and Cylinders," Dynamic Machine Works, Inc., 2001.
Statement regarding prior activities of Dynamic Machine Works, Inc., Oct. 19, 2005.
Da Silva et al., "Dynamic properties of NiTi shape memory alloy and classic structural materials: a comparative analysis", Materials Science Forum vol. 643, 2010, pp. 37-41.
Duerig, et al., Nitinol, Part 1, Mechanism and Behavior, Chapter 9, Alloying and Composition, SMST e-Elastic newsletter, Jan. 2011, ASM International, pp. 1-30.
Littlefield, Andrew and Eric Kathe, "Adaptive Gun Barrel Vibration Absorber", 2002, 12 pages.
NACE Standard MR0175-2000, Standard Material Requirements, Sulfide Stress Cracking Resistant Metallic Materials for Oilfield Equipment, NACE International, 2000, 42 pages.
American Petroleum Institute Specification 5LD "Specifications for CRA Clad or Lined Steel Pipe," 3d edition, 2009, 48 pages.
ASTM A264—12 Standard Specification for Stainless Chromium-Nickel Steel-Clad Plate, Section 7.2.1 Shear Strength, 2012, 6 pages.
McMullen, "Application of Sub-Models to Explore Geometric Effects in Medium Caliber Gun Barrels," Concurrent Technologies Corporation (Date Unknown), 19 pages.
U.S. Appl. No. 14/747,705, filed Jun. 23, 2015.
American National Standards Institute / American Petroleum Institute Specification 5CRA "Specifications for Corrosion Resistant Alloy Seamless Tubes for Use as Casing, Tubing and Coupling Stock," 1st Edition, Feb. 2010, 101 pages.
Dornfeld, W.H., "Thick-Walled Cylinders and Press Fits", 2004 Retrieved from stressanalysis.ueuo.com/PressCylinderHam.pdf on Aug. 8, 2012, 17 pages.
International Tube, "Tubing Terms", Retrieved on Aug. 6, 2012 from www.internationaltube.com/files/glossary.pdf, 18 pages.
Michel, D.J. et al., "Mechanical Properties and Microstructure of Centrifugally Cast Alloy 718," Metallurgical Transactions A, vol. 16A, pp. 1295-1306, Jul. 1985.
Glasier et al., "Precission Seamless Cylinders by the Roll Extrusion Process", Kaiser Rollmet, A Kaiser Aerospace & Electronics Co., American Institute of Aeronautics and Astronautics, 20th Joint Propulsion Conference, Cincinnati, Ohio, Jun. 1984, 7 pages.
Standard Specification for Seamless, Welded, and Heavily Cold Worked Austenitic Stainless Steel Pipes, Designation A 312/A 312M-06, ASTM International, May 2006, 11 pages.
Corn, David L., "Roll Extruding Precision", Metal Progress, Jun. 1977, pp. 78-81.
Manning et al., "Technical Notes: The Effect of Retained Ferrite on Localized Corrosion in Duplex 304L Stainless Steel", Welding Research Supplement, Sep. 1980, pp. 260s-262s.
"On the Application of Flow Forming to the Fabrication of Type B Radioactive Material Package Containment Vessels", Department of Energy Office of Packaging and Transportation (EM-45), Lawrence Livermore National Laboratory, Rev. 1, May 25, 2010, 14 pages.

\* cited by examiner

Preform Hollow - Interface Diffusion Layer - mag. 1,000X

| Elt. | Line | Conc | Units | |
|---|---|---|---|---|
| Cr | Ka | 9.5 | wt.% | |
| Mn | Ka | 0.5 | wt.% | |
| Fe | Ka | 68.7 | wt.% | |
| Ni | Ka | 17.7 | wt.% | |
| Nb | La | 0.3 | wt.% | |
| Mo | La | 3.3 | wt.% | |
| | | 100.0 | wt.% | Total | kV 20.0
Takeoff Angle 31.0°

Flowform Pipe - 1018 steel OD with diffusion 625 Inconel ID
mag. 2,000X

Flowform Pipe - Interface Diffusion Layer - mag. 1,000X

| Elt. | Line | Conc | Units | |
|---|---|---|---|---|
| Cr | Kα | 0.6 | wt.% | |
| Mn | Kα | 0.7 | wt.% | |
| Fe | Kα | 98.3 | wt.% | |
| Mo | Lα | 0.4 | wt.% | |
| | | 100.0 | wt.% | Total | kV 20.0
Takeoff Angle 31.0°

CORROSION RESISTANT BIMETALLIC TUBE MANUFACTURED BY A TWO-STEP PROCESS

CROSS REFERENCE TO RELATED APPLICATIONS

The present application claims the benefit of U.S. Provisional Patent Application No. 61/735,987 filed Dec. 11, 2012 and U.S. Provisional Patent Application No. 61/819,952 filed May 6, 2013, the disclosures of which is incorporated by reference herein in its entirety.

TECHNICAL FIELD

The invention generally relates to bimetallic tubular components and, more particularly, the invention relates to producing corrosion resistant bimetallic tubular components using a two-step metal forming process.

BACKGROUND ART

Considerable cost savings can be attained by the use of clad and lined materials compared to solid Corrosion Resistant Alloy (CRA) materials. This is particularly evident with larger outside diameters CRA tubulars which are necessary to satisfy flow rate requirements and evident with heavier wall thicknesses which are required for strength and pressure requirements for specific downhole applications. CRA tubulars provide the corrosion resistance needed when gas drilling and completion operations involve severe downhole conditions where CO2 and H2S are present. These alloys are utilized when the traditional stainless steels do not provide adequate corrosion resistance. Over the last ten years, CRA tubulars, made out of nickel-based alloys like 825, G3, G50, C276 and 625 have met the material requirements for these wells, but the cost of these tubulars is exorbitant. Recent advances in technology have facilitated the development of a clad tubulars for downhole use composed of an API C90 and T95 outer tube and a CRA corrosion resistant liner. The carbon alloy, C90 or T95 outer tube, provides the structural integrity of the tubular while the CRA liner provides the necessary corrosion resistance. C90 and T95 are AISI 4130 type steel that is quenched (water) and tempered and is suitable for sour service environments per the guidelines in NACE MR0175-2000. CRA's are defined as those alloys whose mass-loss corrosion rate in produced fluids is at least an order of magnitude less than carbon steel, thus providing an alternative method to using inhibition for corrosion control. Table 1 shows the composition of various nickel-based CRA grades that are utilized for maximum corrosion resistance in aqueous $H_2S$ and $CO_2$ environments. The mode of cracking in nickel-based alloys is occasionally intergranular.

When $CO_2$ is present in the flow stream, additional corrosion considerations are necessary. The presence of $CO_2$ can considerably increase the weight loss corrosion of carbon and alloy steel tubing. The corrosion rate is a function of the temperature, $CO_2$ concentration and the partial pressure. Since regulatory and environmental guidelines usually prohibit the allowance for predictable weight loss corrosion (e.g., increasing the wall thickness to compensate for corrosion through the wall of the pipe), the selection of alternate stainless steel and CRA materials are made. When $H_2S$ is present, the corrosion problem switches from a weight loss issue (e.g., pitting and crevice corrosion) to a sulfide stress cracking (SSC) phenomena. Hydrogen sulfide stress cracking (SSC) is defined as the spontaneous fracturing of steel that is simultaneously subjected to an aqueous corrosive hydrogen sulfide medium and a static stress less than the tensile strength of the material. It usually occurs in a brittle manner, resulting in catastrophic failures at stresses less than the yield strength of the material. Hydrogen SSC is basically a hydrogen embrittlement mechanism resulting from the formation of hydrogen ions (H+) in the presence of aqueous hydrogen sulfide (H2S). Over the last five years, there has been an increasing need for downhole tubing suitable for severe $CO_2$ and $H_2S$ environments. Numerous nickel-based alloys have well established corrosion resistant attributes for these production applications but are extremely costly when utilized as a solid wall tubular. The exorbitant cost of solid wall CRA tubulars has resulted in many projects being deemed too costly or postponed and therefore have not been pursued.

SUMMARY OF EMBODIMENTS

In accordance with one embodiment of the invention, a method of producing a bimetallic tubular component includes providing a first tubular workpiece having an inner diameter and a second tubular workpiece having an outer diameter. The first and second tubular workpieces have dissimilar cold-working processing parameters. The method further includes diffusion bonding the inner diameter of the first tubular workpiece to the outer diameter of the second tubular workpiece, and flowforming the diffusion bonded tubular workpieces to form the bimetallic tubular component. Alternatively, hot extruding, explosive cladding, laser deposition cladding, rolling and/or fuse welding may be used instead of, or in addition to, diffusion bonding.

In some embodiments, the cold-working processing parameters include feed rates, speed rates, and/or wall reduction percentages. The diffusion bonding may be a hot isostatic pressing process. The hot isostatic pressing process

TABLE 1

| CRA Alloy Compositions | | | | | | | | |
|---|---|---|---|---|---|---|---|---|
| ALLOY (UNS No.) | Cr | Ni | Mo | Fe | Mn | C-Max | Cb + Ta | Other-Max |
| 825 (N08825) | 22 | 42 | 3 | Bal | 0.5 | 0.03 | | .9 Ti, 2 Cu |
| 925 (N088925) | 19/21.0 | 24/28.0 | 6/7.0 | Bal | 1.0 Max | 0.02 | | 1.5 Cu |
| 725 (N088725) | 21 | 58 | 8 | Bal | 0.25 | 0.02 | | |
| 625 (N08625) | 22 | Bal | 9 | 2 | 0.2 | 0.05 | | 3.5Cb |
| G3 (N06985) | 21/23.5 | Bal | 6/8.0 | 18/21.0 | 1.0 Max | 0.015 | .50 Max | 2.5 Cu, 2.4 W |
| G30 (N06030) | 28/31.5 | Bal | 4/6.0 | 13/17.0 | 1.5 Max | 0.03 | .3/1.5 | 4.0 W |
| G50 (N06050) | 19/21.0 | 50.0 Min | 8/10.0 | 15/20.0 | 1.0 Max | 0.015 | .50 Max | 2.5 Co |
| C276 (N010276) | 15 | Bal | 16 | 6 | — | 0.01 | | 2 Co, 3.5 W | may be performed in an inert atmosphere. Each tubular workpiece may have an end and a gap may be formed between the inner diameter and the other diameter. The method may further include providing a port that goes through the first tubular workpiece to the gap between the two workpieces, sealing the end of the first tubular workpiece to the end of the second tubular workpiece in order to form a sealed area between the two workpieces, and forming a vacuum between the two workpieces in the gap before the diffusion bonding process. The second tubular workpiece may have a hardness value greater than about two times the hardness value of the first tubular workpiece before the flowforming process.

BRIEF DESCRIPTION OF THE DRAWINGS

The foregoing features of the invention will be more readily understood by reference to the following detailed description, taken with reference to the accompanying drawings, in which.

DESCRIPTION OF ILLUSTRATIVE EMBODIMENTS

Figure 1:
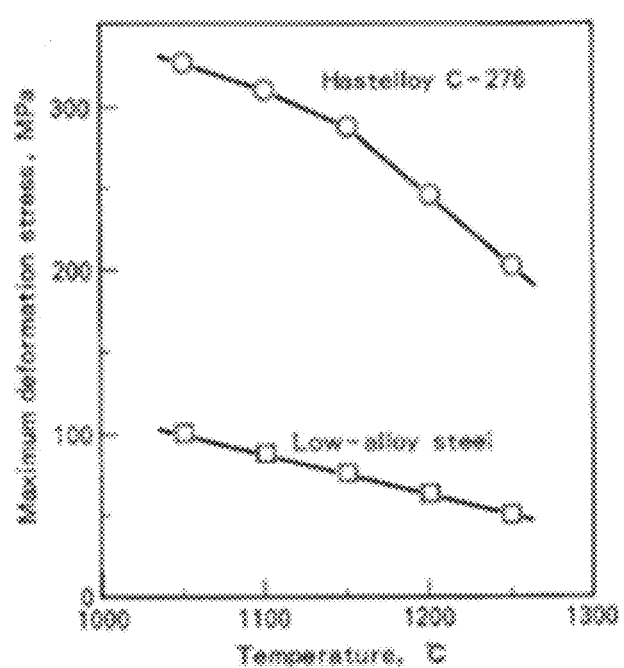
FIG. 1 is a graph of stress versus temperature showing the large delta between hot deformation resistances of alloy C-276 (same as alloy 625) and low alloy steel.

Various embodiments of the present invention provide a two-step process, diffusion bonding (DB) and cold flowforming, that has been developed for manufacturing bimetallic pipes and tubes. With this new process, dissimilar metals having a large difference in their cold deformation resistances can be metallurgically bonded into one preform hollow and flowformed into long lengths, creating a clad or bimetallic long tube/pipe. It is important to join the two metals metallurgically in the preform state by DB which can be done during a hot isostatic pressing (HIP) process. DB is a solid-state joining process wherein joining is accomplished without the need for a liquid interface (brazing) or the creation of a cast product via melting and resolidification (welding). After the preform DB process has been done, step two is to flowform the clad preform into a clad flowformed tube/pipe. The two-step process may be used for the manufacture of corrosion resistant pipes for oil country tubular goods (OCTG) for sour service. In one embodiment, the inner and outer materials of the pipe may be a nickel-based superalloy (alloy 625) and sulfide stress cracking (SSC) resistant low alloy steel (1018 steel), respectively, although other dissimilar metals may also be used. A bimetallic pipe with uniform thickness of both outer and inner metals may be obtained by the new process. The corrosion resistance of the two layers of metals as well as the strength of the outer material exhibits satisfactory performance to comply with the requirements for OCTG use. Embodiments of the two-step process, DB and cold flowform process, are promising for producing bimetallic tubes/pipes from two materials that have much different cold strain rates (cold workability). Therefore, a CRA clad lined tubular may be produced according to embodiments of the present invention that provides the necessary corrosion protection, structural integrity and also offers considerable cost savings over solid wall CRA tubulars. With the increasing need worldwide for more gas to satisfy world demand, embodiments of the present invention will provide the economic incentive to explore and produce oil and gas in regions that were previously uneconomical. Details of illustrative embodiments are discussed below.

Clad Lined Pipe Product Development:

Over the last twenty years, there have been several manufacturing methods developed for producing CRA clad/lined tubulars. The American Petroleum Institute (API) has also developed a specification for the CRA clad and lined line pipe (API 5LD, $3^{rd}$ edition 2009). Clad and lined tubulars have gained relatively wide acceptance for use in transporting petroleum products, for refinery applications and for downhole oil and gas operations. Clad or lined CRA tubulars are classified in two basic categories: mechanically lined and metallurgically bonded.

Mechanically lined tubulars are the simplest and most economic method of producing clad pipe. This method of manufacture does not create a metallurgical bond between the outer pipe used for structural integrity, and the inner liner pipe that is selected for the appropriate corrosion resistance properties. Mechanically lined CRA pipe has gained wide market acceptance. This method of manufacture provides better quality control features compared to metallurgically bonded pipe because each of the pipe components (outer pipe and liner) can be independently inspected utilizing traditional inspection techniques. The lack of a metallurgical bond at the interface of the outer pipe and inner liner eliminates the difficulties associated with ultrasonic flaw inspection of the piping components. For applications where bending is critical for the serviceability, this method of manufacture is unsuitable due to buckling of the liner. Gas migration between the material layers is a concern for corrosion.

Metallurgically bonded tubulars are those in which there is a metallurgical bond between the structural outer pipe and the corrosion resistant inner pipe. There are several manufacturing techniques currently employed to produce these products and are described below. The metallurgically bonded tubular tends to be more costly than those that are mechanically lined. Longitudinally welded pipe is produced today from clad plate produced by hot roll formed or explosively bonded plate. Although length restrictions exist with these two methods of manufacture, it is common to girth weld two lengths together to fabricate a longer length tube, despite girth welds being costly and unpopular.

Clad Plate Forming: Clad plates can be produced by three common methods; hot roll bonding, explosive bonding and weld overlay. Clad plates have been used extensively for many processing vessels, separators, heat exchangers and plates. Hot, roll bonding accounts for more than 90% of the clad plate production, worldwide (~55,000 tons/year). Once the clad plate is produced, it is formed into a tubular shell and longitudinally welded full length. There is always a concern for a failure at the weld.

Extrusion Method: This production method involves taking a combination billet of carbon steel and CRA material and hot extruding the hollow to longer lengths. A thick-walled carbon steel tubular is machined to very tight tolerances and then a CRA tubular is inserted into the bore. Often the two materials are heat shrunk together to achieve a tight mechanical fit. The ends of the combination billet are commonly seal welded prior to extruding to prevent the intrusion of air, oxygen and other contaminants into the interface. This heavy wall tubular billet is then extruded at temperatures in excess of 1260° C. (2300° F.) which results in a metallurgical bond between the carbon steel outer pipe and the CRA material on the inner diameter surface. The final length of the clad extrusion is limited by the capacity (capable forces to hot work the tubular) of the extrusion press. Metallurgically bonded extruded pipe has had some limited use for the bends of transmission, gathering and flow lines as this method of manufacture is more costly than the mechanically lined CRA tubulars which have found significant application for the straight portions of these oil/gas transportation systems. Extruding mild steel at 2300° F. can cause deleterious grain growth.

Traditionally, there exists restriction on the combination of two materials that can be extruded together. The difference between the hot deformation resistances of two materials should not be very large or the two materials will deform separately (shear apart during extruding) because of the large delta in strain rates at a given temperature. Alloy C-276 (UNS NI0276) and alloy 625 (UNS N06625) are the most common CRAs for sour service. Because of their high contents of molybdenum, these alloys exhibit much larger high temperature deformation resistances than carbon and low alloy steels. FIG. 1 shows a typical example of the differences between two dissimilar metals. In FIG. 1, the deformation resistances of alloy C-276 and of a low alloy steel as a function of temperature are compared with each other. At a common hot working temperature of 2100° F. (1150° C.), for example, the deformation resistance of alloy C-276 is about 3.9 times as high as that of the low alloy steel. For this reason, no references can be found concerning the successful production of clad pipes and tubes with liner materials which consist of large, high temperature deformation stress materials such as alloy C-276 and alloy 625 with a substrate material of carbon and low alloy steels. As far as the literature is concerned, the liner material of conventional clad pipes and tubes is limited up to alloy 825 (UNSN08825). The hot deformation resistance of this alloy is twice that of low alloy steels.

Figure 2:
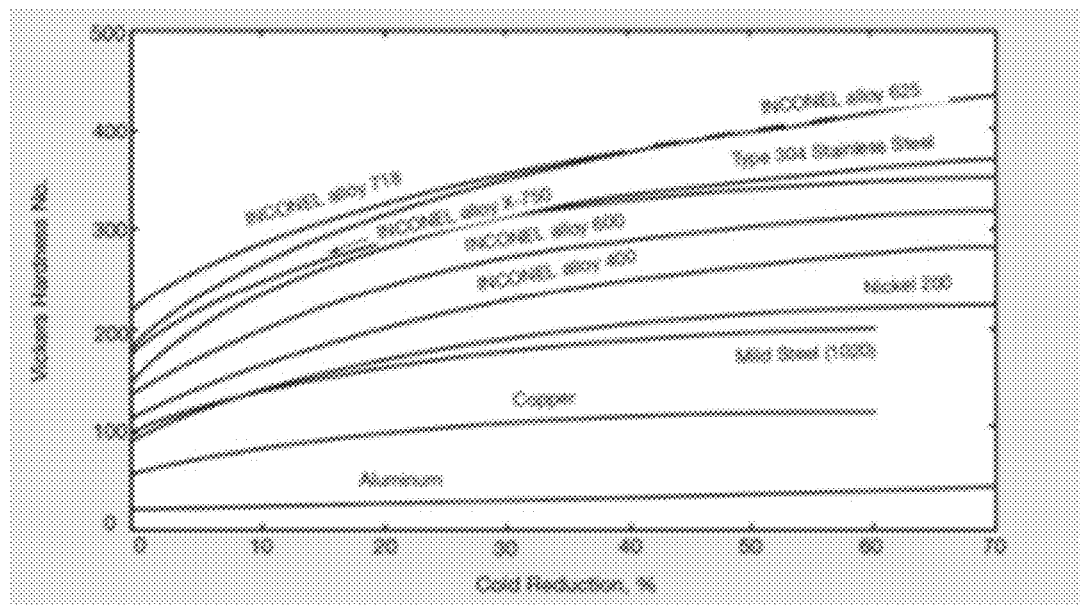
FIG. 2 is a graph of hardness versus cold reduction percentage showing the effect of cold work on Vickers hardness for various alloys.

Cold Forming: Often cold working tubes are preferred to hot extruding tubes because of the better control in dimensional accuracies, superior surface finishes achieved, and the ability to increase the materials' strength thru varying the amounts of wall reduction (cold work). In the case of 1018 or 1020 steel, the annealed hardness is ~100 Vickers and the hardness increases to ~160 Vickers after about 75% wall reduction with cold working. See, e.g., FIG. 2. In the case of alloy 625, its strength is derived from cold working (e.g., using flowflorming). The cold work has a stiffening effect of molybdenum and niobium on its nickel-chromium matrix; thus precipitation-hardening treatments are not required. The annealed hardness of alloy 625 is ~200 Vickers, double that of annealed 1018 or 1020 steel. After about 75% wall reduction with cold working of alloy 625, the hardness increases to ~425 Vickers, again more than double that of 75% wall reduction with cold working of 1018 or 1020 steel. See, e.g., FIG. 2. It is clear, 1018 is very soft compared to alloy 625. Furthermore, 1018 or 1020 steel does not work harden anywhere comparable to alloy 625. The processing parameters for cold working mild steel compared to CRAs are very different. Mild steels are soft, ductile and are capable of large wall reductions without the need for intermediate annealing steps. The mild steels do not work harden quickly so speed and feet rates can be pushed to go faster, increasing cycle times. In contrast, CRAs require smaller wall reductions, more annealing steps in between cold work passes, and slower speeds and feeds due to excessive and quick cold work hardening of the material. In short, the processing parameters for mild steel are vastly different to the processing parameters for CRAs. For these reasons, it is counterintuitive to simultaneously cold work these alloys using a flowforming process.

CRA Pipe Manufactured by a Two-Step Process; Diffusion Bonding a Preform Hollow and Cold Flowforming:

Embodiments of the present invention discovered that two metals having very different hardness levels, which have very different cold deformation rates and/or which cold work at very different strength levels, may be simultaneously cold worked via flowforming if both metals are metallurgically joined before the cold working process. Among the various technologies for joining two metals include diffusion bonding thru the Hot Isostatic Pressing (HIP) technology. For example, an inner and outer tube can loosely be assembled together (e.g., about 0.020" gap or less between the two tubes) and subsequently DB or HIP into a bimetallic, metallurgically bonded hollow preform. In lieu of two solid tubes being DB together, powder metal may also be DB or HIPed to the other tube to form the bimetallic hollow preform. For example, the interface between a low alloy steel substrate and an alloy 625 liner, joined by HIP, exhibits a high joint strength up to about 930 MPa. Accordingly to ASTM 264 for Stainless Chromium-Nickel Steel-Clad Plate, section 7.2.1 Shear Strength, the minimum shear strength of the alloy cladding and base metal shall be 20,000 psi (~140 MPa).

Step 1, Diffusion Bonding the Preform:

In one embodiment, the bimetallic hollow preform (e.g., steel on the OD and CRA on the ID) is created by joining the two dissimilar metals metallurgically by diffusion bonding (DB). As mentioned above, DB is a solid-state joining processes wherein joining is accomplished without the need for a liquid interface (brazing) or the creation of a cast product via melting and resolidification (welding). DB is a process that produces solid-state coalescence between two materials under conditions where the joining occurs at a temperature below the melting point, Tm, of the materials to be joined (usually >1/2 Tm). Coalescence of contacting surfaces is produced with loads below those that would cause macroscopic deformation to the part. In some embodiments, a bonding aid may be used, such as an interface foil or coating, to either facilitate bonding or prevent the creation of brittle phases between the dissimilar materials. Preferably, the material should not produce a low-temperature liquid eutectic upon reaction with the material(s) to be joined. Thus, diffusion bonding facilitates the joining of materials to produce components with no abrupt discontinuity in the microstructure and with a minimum of deformation. Usually, the DB process is limited to either press or gas pressure or bonding approaches.

Figure 3A:
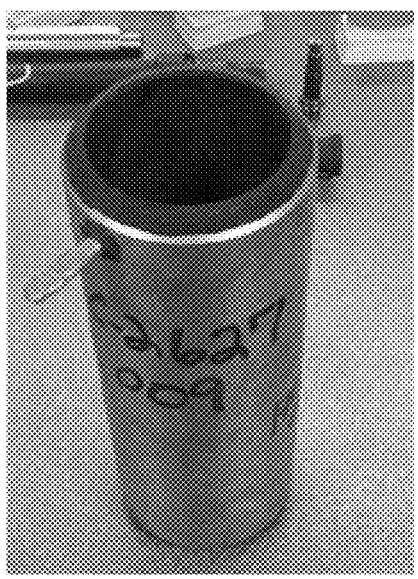
FIGS. 3A and 3B are macrographs showing a diffusion bonding preform before and after hot isostatic pressing and diffusion bonding, respectively, with 1018 steel on the outer diameter (OD) and alloy 625 on the inner diameter (ID) according to embodiments of the present invention.
Figure 3B:
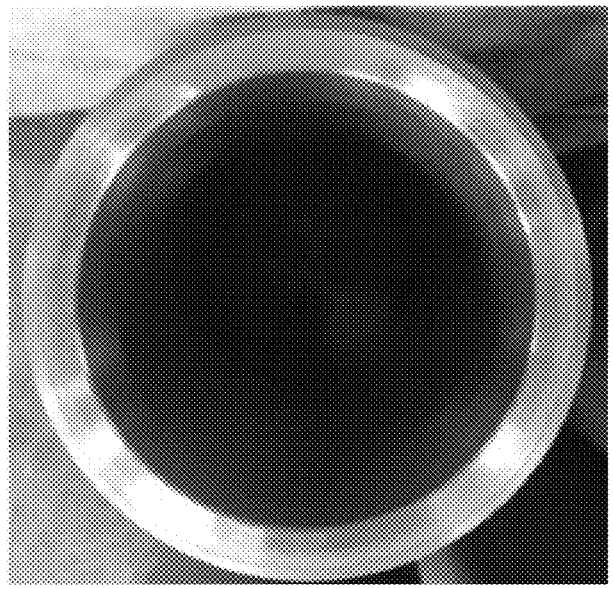
Figure 4:
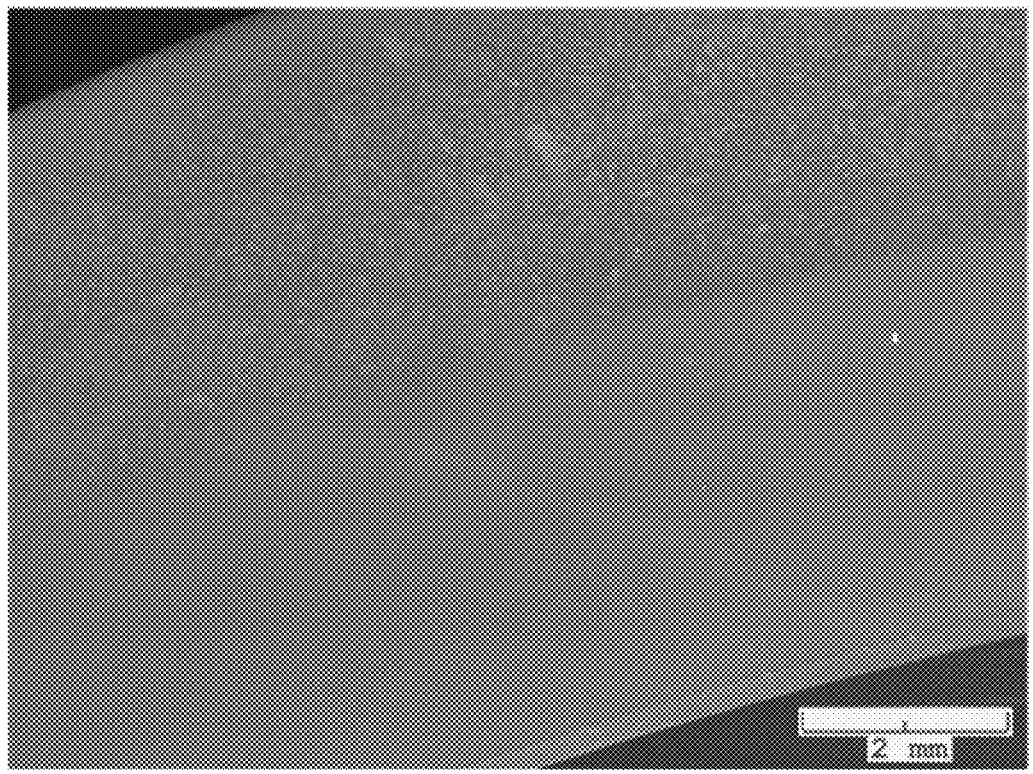
FIG. 4 is a photomicrograph showing a transverse cross-sectional view of the diffusion bonding preform shown in FIG. 3B according to embodiments of the present invention.
Figures 5A, 6B:
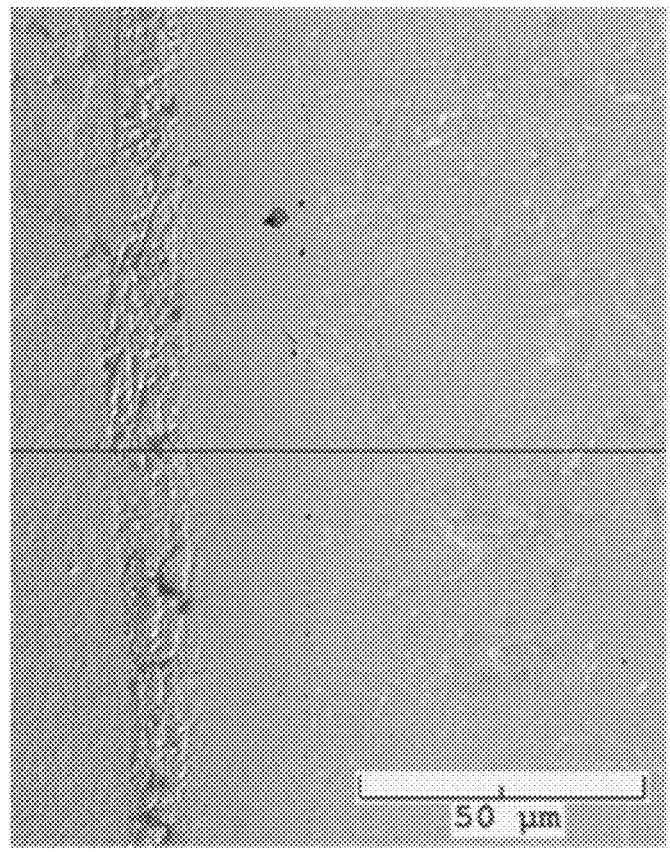
FIG. 5A is a photomicrograph showing a transverse cross-sectional view of the diffusion bonding preform shown in FIG. 3B.
FIGS. 6A and 6B show the chemical analysis report of the diffusion layer at the 1018 and alloy 625 metallurgical bond shown in FIG. 3B.
Figure 5B:
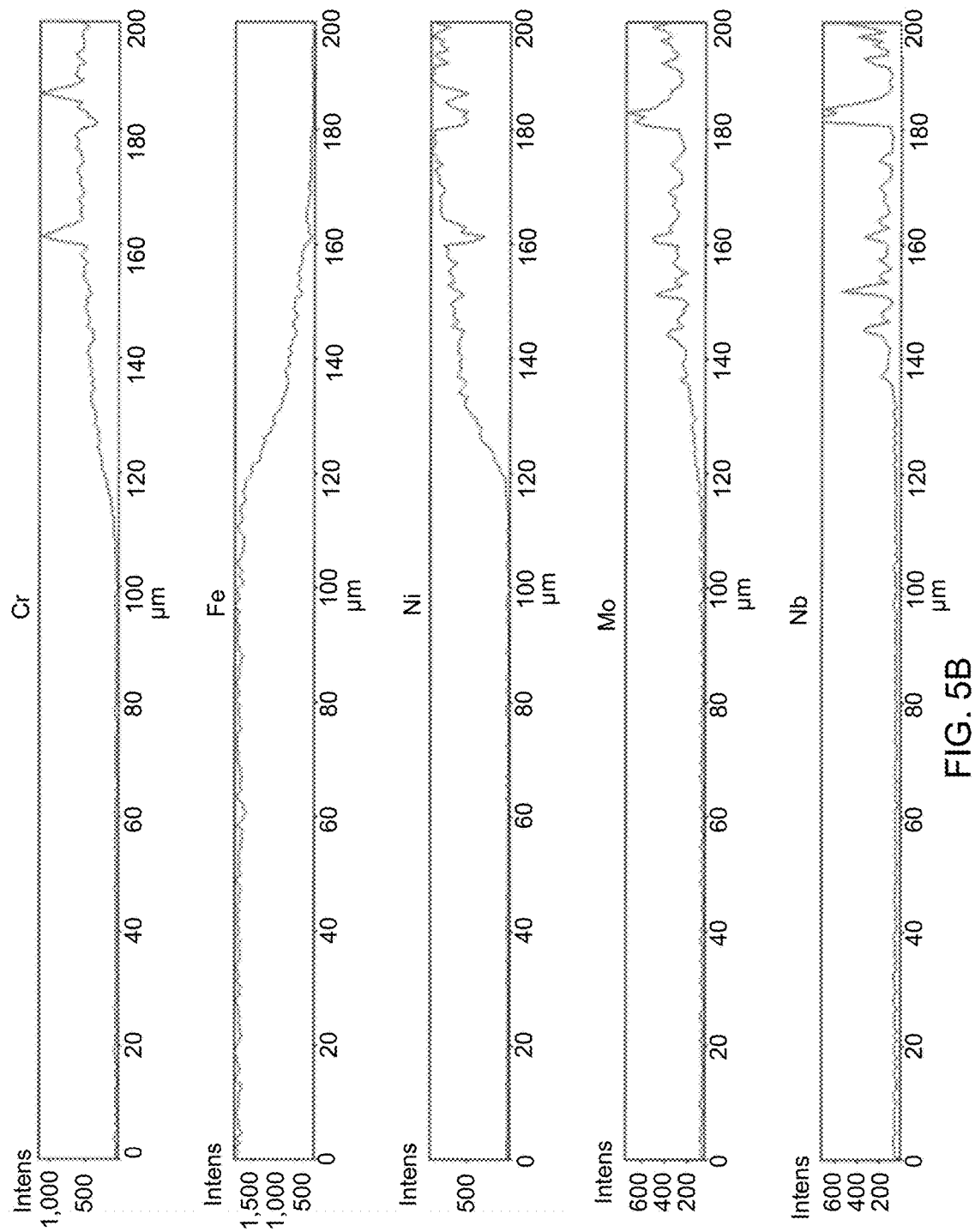
FIG. 5B is the chemical analysis along the line shown in FIG. 5A showing that no deleterious intermetallic phases are formed at the diffusion layers between the 1018 steel and the alloy 625.
Figure 6A:
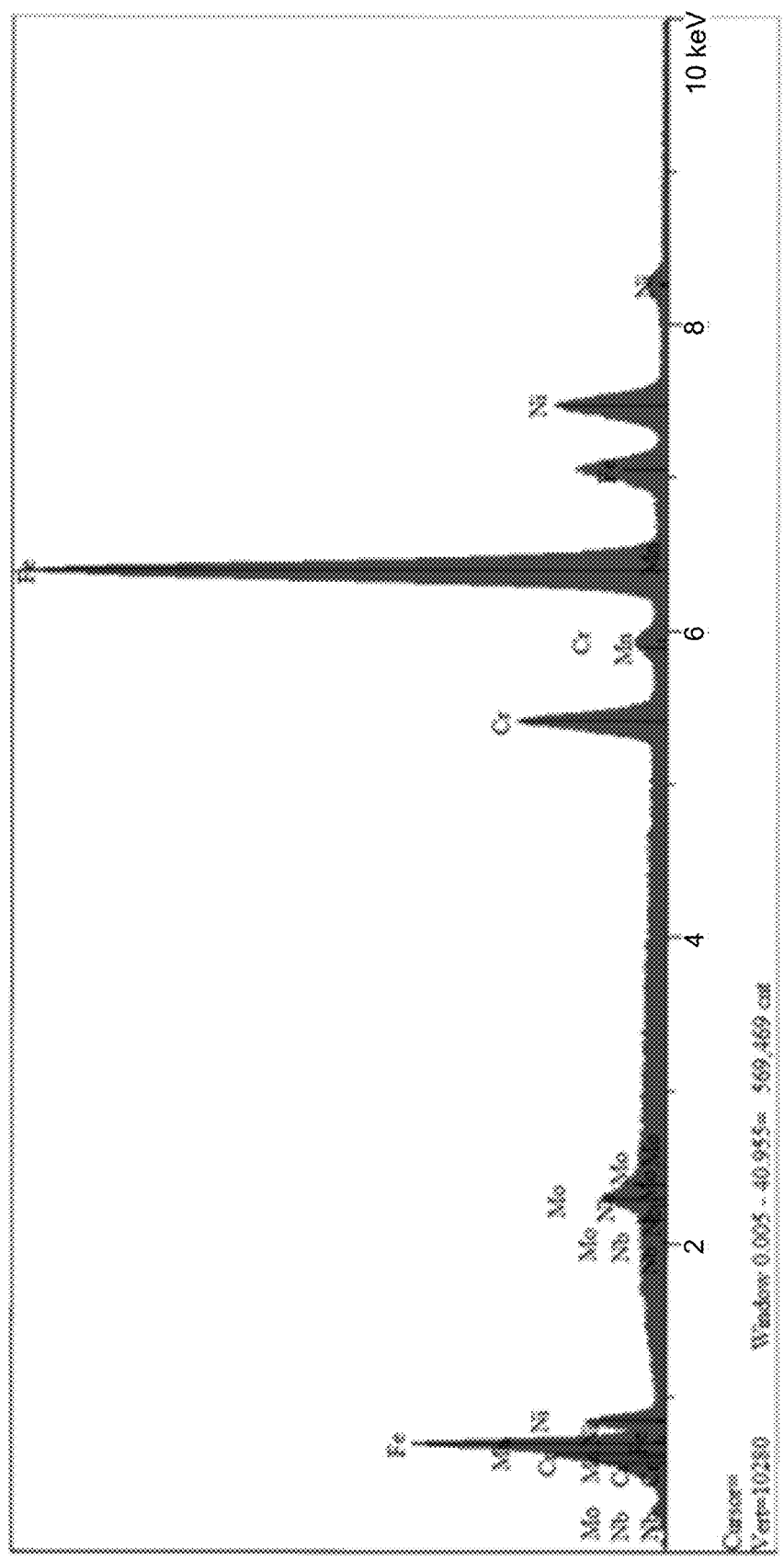

Hot Isostatic Pressing (HIP) is a common method of achieving DB. Special techniques are employed to eliminate detrimental hardening and the formation of oxides at the bonding interface due to the precipitation of intermetallic phases or carbides. HIPing in a vacuum can help prevent the formation of these oxides and intermetallic phases. When HIP is performed in an inert atmosphere, a vacuum can be created in the annulus between both materials by evacuating the air before (or during) the DB process. Welding close the gaps on both ends of the inner and outer layers creates a sealed pressure vessel. FIG. 3A shows a port drilled thru the outer sleeve into the annulus. Thru the port, a vacuum can be pulled between the outer and inner layers and DB can be performed. FIG. 3B shows a macrograph of the preform after diffusion bonding. FIG. 4 shows a micrograph of the two materials after diffusion bonding. FIGS. 5A and 5B show the diffusion layer with no deleterious intermetallic phases formed between the two materials. FIGS. 6A and 6B show a chemical analysis of the diffusion layer between the two dissimilar materials. Other embodiments of creating a bimetallic preform may include cladding dissimilar metals thru one of the following methods; hot roll bonding, explosive bonding and/or weld overlay.

Step 2, Flowforming:

Flowforming is a chipless, metal forming technology used to fabricate cylindrical tubular components and pipes though controlled wall reduction by cold working. Often flowform products are seamless and very precise. Flowforming offers a net-shape manufacturing approach, requiring less material to make components and often substantially reducing the costs associated with secondary manufacturing operations such as machining, straightening, honing and grinding. Seamless components with high length to diameter ratios, e.g., up to about 50 to 1, realize the greatest cost savings through the flowforming manufacturing process. Wall thicknesses as thin as about 0.010" can be flowformed irrespective of the diameter of the tube. The flowforming process may be used to produce monolithic pipes and tubulars made out of various metals and metal alloys, such as stainless steel, zirconium, titanium, cobalt and nickel alloys (e.g., CRAs).

Figure 7:
FIG. 7 is a macrograph showing a flowformed clad tube with 0.149" thick 1018 steel on the OD and 0.049" thick alloy 625 Inconel on the ID according to embodiments of the present invention.
Figure 8:
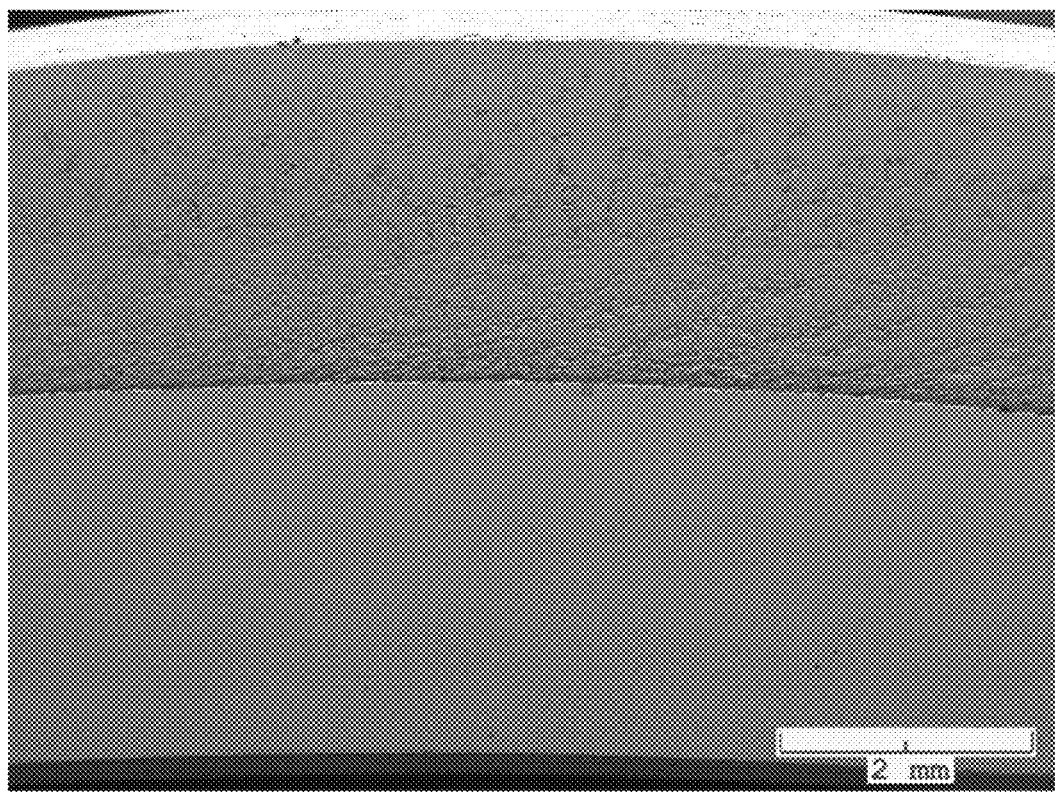
FIGS. 8 and 9 are photomicrographs at 24× and 2,000× magnification, respectively, showing a transverse cross-sectional view of the flowformed bimetallic tube shown in FIG. 7 according to embodiments of the present invention.
Figure 9:
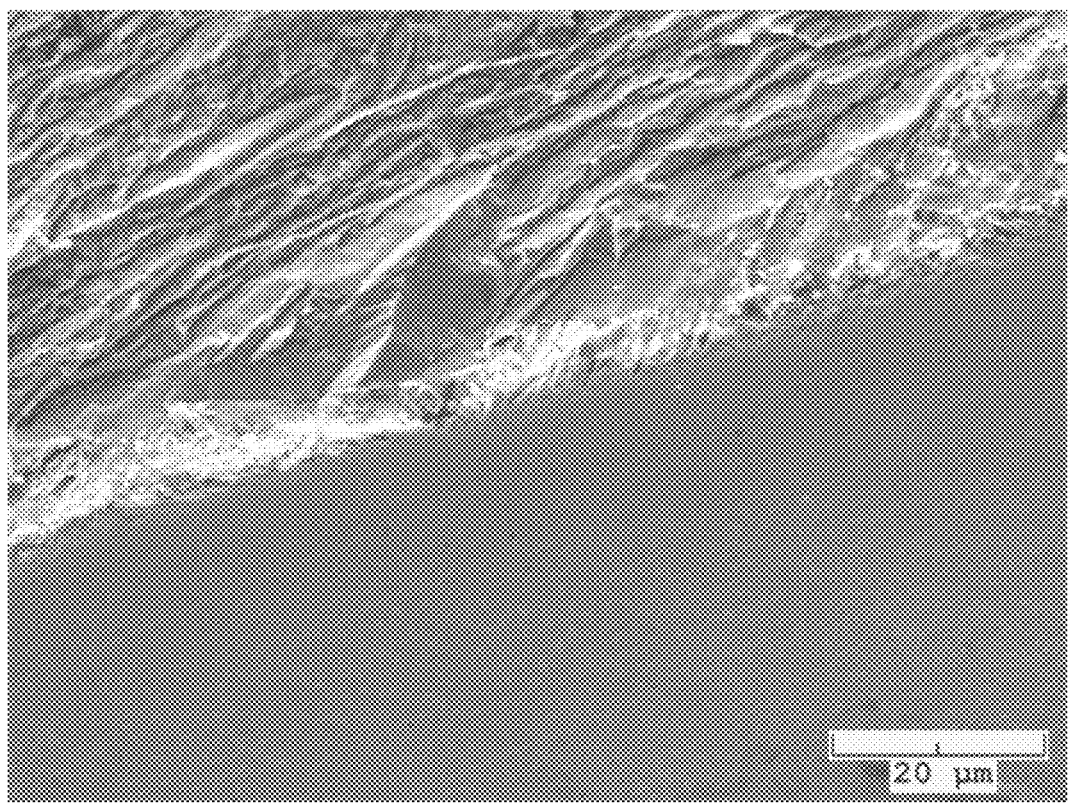
Figures 10A, 11B:
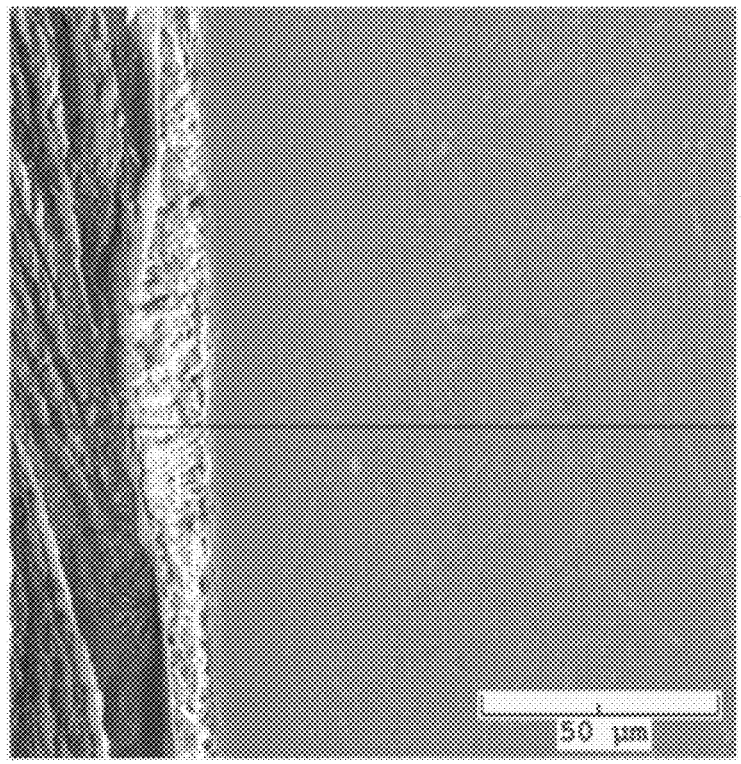
FIG. 10A is a photomicrograph showing a transverse cross-sectional view of the flowformed bimetallic tube shown in FIG. 7.
FIGS. 11A and 11B show the chemical analysis report of the diffusion layer at the 1018 and alloy 625 metallurgical bond shown in FIG. 7.
Figure 10B:
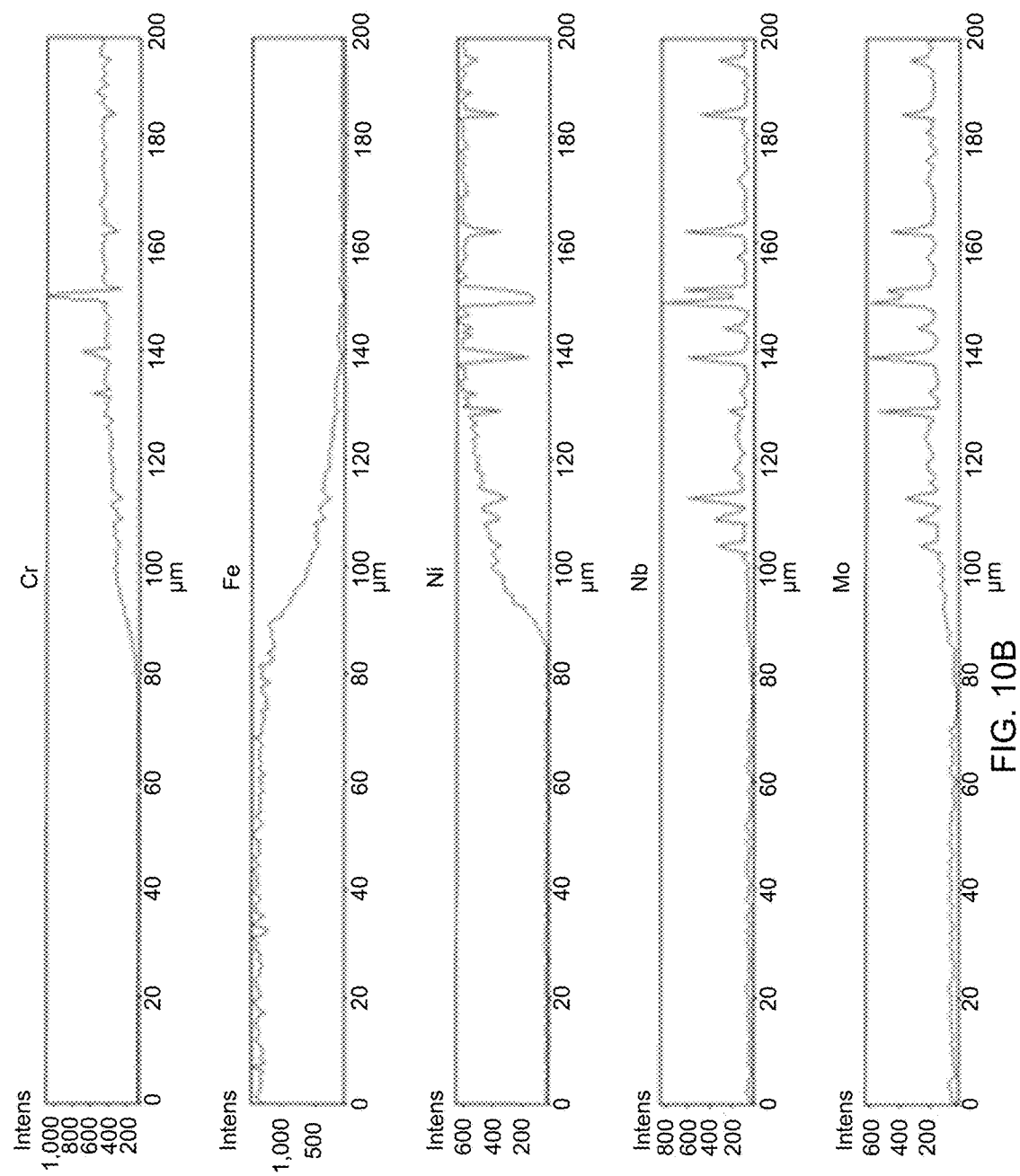
FIG. 10B is the chemical analysis along the line shown in FIG. 10A showing that no deleterious intermetallic phases are formed at the interface between the 1018 steel and the alloy 625.
Figure 11A:
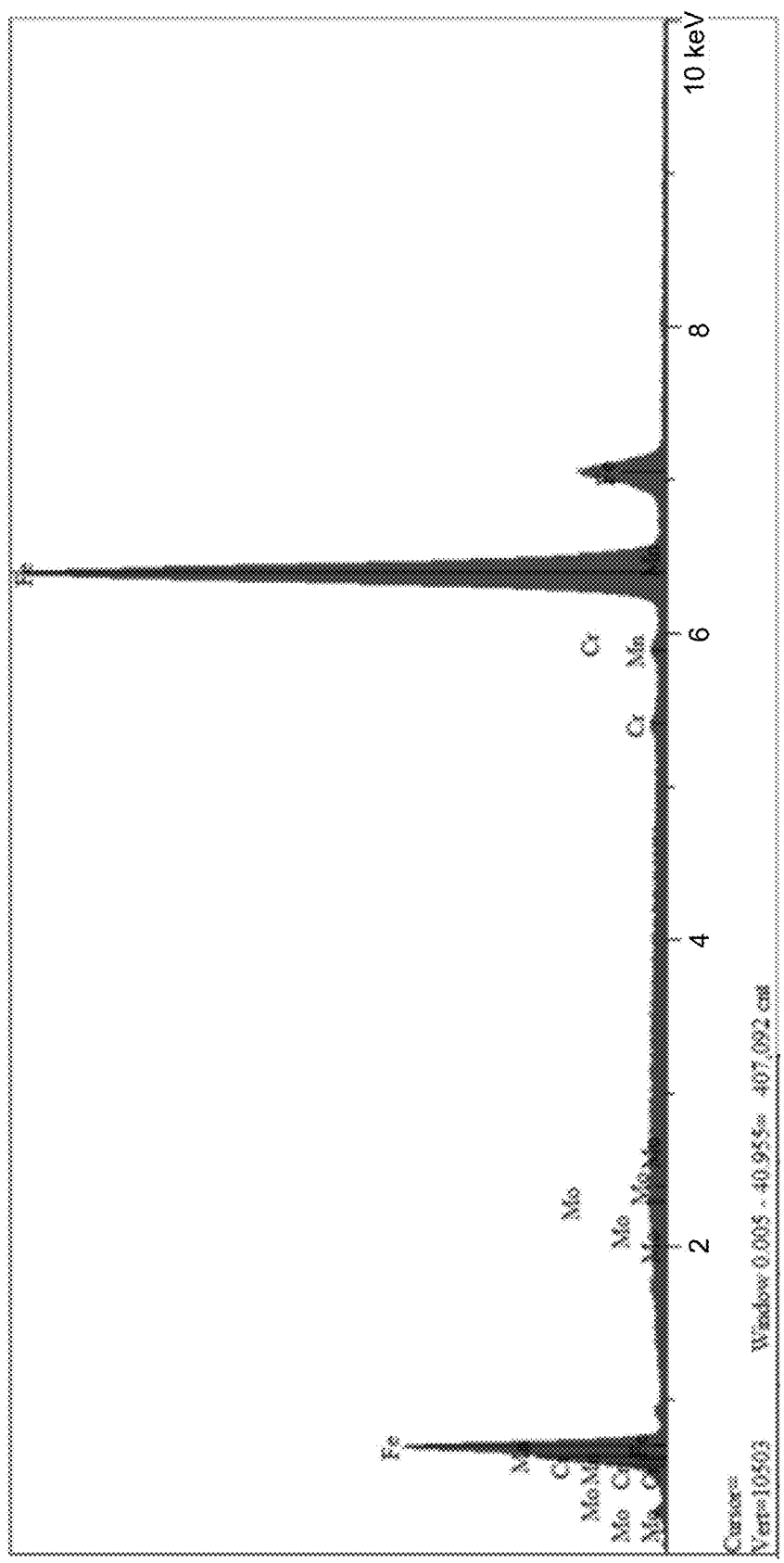

The flowforming process uses hydraulic forces to drive three CNC-controlled rollers to the outside diameter of a cylindrical preform which is fitted over a rotating, inner mandrel. The rollers compress against the preform wall thickness and plastically deform the preform wall. The desired geometry is achieved when the preform is compressed above its yield strength and plastically deformed or "made to flow". As the preform's wall thickness is reduced by the process, the length of the preform is increased as it is formed over the inner, rotating mandrel. This wall reduction with a cold work process causes the material's mechanical properties to increase, while refining the microstructure and orienting the crystallographic texture. Dimensional accuracies, specifically roundness, wall concentricity and straightness are normally achieved well beyond what can be realized through hot forming processes such as extruding or roll and welding of tubes and pipes. During flowforming, it is typical to reduce the preform wall thickness at least by about 20%, and in many instances the preform wall thickness is reduced by as much as 75%, in one or more (e.g., two or three) consecutive flowform passes. For example, FIG. 7 shows a macrograph of a flowformed, clad tube that had a preform wall thickness of 0.290" (0.220" steel OD diffusion bonded to 0.090" alloy 625) that was flowformed to a wall thickness of 0.198" for 31.7% wall reduction, resulting in a flowformed, clad wall thickness of 0.149" steel and 0.049" alloy 625. In some embodiments, the clad tube may be re-flowform to produce a thinner clad tube. FIG. 8 shows a micrograph of the two bonded materials after flowforming with an ASTM grain size around 8-12 at 24× magnification. FIGS. 9 and 10A show the diffusion layer, after flowforming, with no deleterious intermetallic phases formed between the two materials. FIG. 10B is the chemical analysis along the line shown in FIG. 10A. FIGS. 11A and 11B show a chemical analysis of the diffusion layer between the two dissimilar materials after flowforming.

Forming High Strength Clad Pipe with an Outer Jacket Alloy without Heat Treatment In many situations, high strength clad pipe may be necessary or desirable. For example, where the clad pipe is to be used in pipeline transportation systems or used for drilling applications in the petroleum and natural gas industries, the clad pipe typically needs to meet certain strength standards, e.g., such as those set out in the American Petroleum Institute's API Specification 5LD "Specifications For CRA Clad Or Lined Steel Pipe".

However, where the clad pipe is formed by overlaying an inner CRA with an outer jacket formed from low alloy steel, heat treatment is typically needed in order to give the low alloy steel its desired strength. Therefore, a heat treatment operation is performed on the clad pipe after flowforming when the clad pipe is formed by flowforming. Unfortunately, this heat treatment operation, which typically includes a quench and temper operation, may have significant negative effects on the flowformed pipe, e.g., (i) the heat treatment can distort the pipe dimensionally;

(ii) the heat treatment can soften or anneal the CRA which forms the inner core of the clad pipe; and (iii) the heat treatment can add significantly to the cost of the clad pipe.

According to embodiments of the present invention, the clad pipe may be formed by overlaying the inner core CRA with an outer jacket alloy which does not require heat treatment after flowforming. Thus, the clad pipe may be formed from two cold workable alloys (e.g., the inner core CRA and the outer jacket alloy) which do not require heat treatment after flowforming. The clad pipe is used in its cold worked condition.

In one embodiment of the present invention, the outer jacket alloy includes inexpensive stainless steel, duplex stainless steel, and/or an aluminum alloy, etc. The outer jacket alloy may be selected so that the cold working associated with flowforming acts to increase the strength of the material. For example, the outer jacket alloy may include a material shown in Table 2 below.

TABLE 2

Selected DSS

| Generic Name | UNS Number | Cr | Ni | Mo | Cu | W | N | C | PREN[(4)] |
|---|---|---|---|---|---|---|---|---|---|
| U-50M[(B)] | — | 21 | 7.5 | 2.5 | 1.5 | — | ? | 0.06 | 30 |
| 22Cr | S31803 | 22 | 5.5 | 3 | — | — | 0.14 | 0.02 | 34 |
| 25Cr | S32550 | 25 | 8 | 3.0 | 2.0 | — | 0.2 | 0.02 | 38 |
| 25Cr | S31260 | 25 | 7 | 3.0 | 0.5 | 0.2 | 0.15 | 0.02 | 38 |
| 25Cr | S32520 | 25 | 6.5 | 3.5 | — | — | 0.26 | 0.02 | 41 |
| 25Cr | S32750 | 25 | 7 | 3.5 | — | — | 0.28 | 0.02 | 42 |
| 25Cr | S32760 | 25 | 7 | 3.5 | 0.7 | 0.7 | 0.28 | 0.02 | 42 |
| 25Cr | S39277 | 25 | 7 | 3.8 | 1.6 | 1.0 | 0.28 | 0.02 | 43 |
| 25Cr | S39274 | 25 | 7 | 3.0 | 0.5 | 2.0 | 0.28 | 0.02 | 43 |

[(4)]Cr + 3.3 (Mo = 0.5 W) = 16N (wt %).
[(B)]Cast product with 25% to 40% ferrite.

The inner CRA may be selected so that the cold working associated with flowforming acts to increase the strength of the material. For example, the inner core CRA may include a material shown in Table 3 below.

TABLE 3

CW, >30% Ni, >3% Mo

| | | | | | | | | | | | | |
|---|---|---|---|---|---|---|---|---|---|---|---|---|
| 28 | N08028 | Bal. | 27 | 31 | 3.5 | 1.0 | 0.3 | — | — | — | — | 0.02 |
| 825 | N08825 | Bal. | 22 | 42 | 3.0 | 2.0 | 1.0 | — | — | — | — | 0.03 |
| G-3 | N06985 | 19 | 22 | 45 | 7 | 2.0 | — | — | 0.8 | 1.5 | 2 | — | 0.01 |
| 2550 | N06975 | 15 | 25 | 51 | 6.5 | 1.0 | 1.0 | — | — | — | — | 0.01 |
| 625 | N06825 | 3 | 22 | 62 | 9 | — | 0.2 | 0.2 | 3.5 | — | — | — | 0.03 |
| C-276 | N10276 | 6 | 16 | 56 | 16 | — | — | — | — | 4 | 2 | 0.35 V | 0.01 |

Therefore, the negative effects associated with a post-flowforming heat treatment may be eliminated by replacing the low alloy steel jacket with an alloy jacket which does not require heat treatment to provide the desired strength where a high strength clad pipe formed by flowforming is necessary or desirable. Preferably, this may be done by forming the outer jacket out of inexpensive stainless steel, duplex stainless steel, and/or an aluminum alloy. In this case, the clad pipe is flowformed and there is no subsequent heat treatment. The clad pipe is used in the cold worked condition. Preferably, the outer jacket is formed out of an alloy which has its strength increased by the cold working associated with flowforming, e.g., such as one of the materials shown in Table 2 above. Preferably, the inner CRA is also selected from a material which has its strength increased by the cold working associated with flowforming, e.g., such as one of the materials shown in Table 3 above.

Bonding the Clad Preform

As noted above, the clad pipe may be formed by generating a clad preform having an inner core (e.g., CRA) covered by an outer jacket (e.g., an alloy) and then metallurgically joining the two metals before the cold working process of flowforming. In one embodiment, this metallurgical joining of the two metals is achieved by diffusion bonding. The metallurgical joining of the two metals may also be achieved by:

(i) bonding bimetallic sheet through explosive bonding, then rolling and welding so as to form the hollow preform, then flowforming; or (ii) hot extruding the bimetallic hollow preform so as to create a metallurgical bond in the hollow preform, then flowforming.

It is generally not practical to use explosive bonding or extrusion bonding over the large lengths commonly associated with pipeline sections (e.g., 40 feet). However, it is practical to use explosive bonding or extrusion bonding over the shorter lengths commonly associated with the hollow preforms used for flowforming (e.g., 8 feet), so these other methods for metallurgical joining the two metals become practical when used in conjunction with flowforming.

Embodiments of the present invention include a new, two-step manufacturing process, diffusion bonding and flowforming, for producing bimetallic pipes and tubes made of two dissimilar metals or alloys. For example, a CRA liner material may be used on the bore with the OD material made of steel. The two materials may have dissimilar hardness and/or strain hardening levels that typically require two different processing parameters to cold work the materials. It was surprisingly found that the two materials, once diffusion bonded together, were able to be flowformed with one set of processing parameters. The two materials did not shear or rip apart from one another during the flowforming process. It is believed that one material provides support for the softer, more ductile material, allowing both materials to be flowformed together to produce a clad, cold-worked tube.

For example, a liner material made of alloy 625 and a substrate OD material made of sour gas resistant low alloy steel (e.g., 1018 steel) may be diffusion bonded and flowformed into longer pipe using embodiments of the present invention. The preform material is metallurgically bonded together thru the diffusion bonding process which removes or reduces oxides from the bonding surface. Uniform or varying wall thicknesses can be flowformed for both layers. The flowformed, bimetallic pipe, formed according to embodiments of the present invention, provides excellent corrosion resistance. For example, the alloy 625 layer exhibited corrosion resistance which was almost identical with that of commercial solid alloy 625 pipe. The SSC resistance of a low alloy steel substrate satisfies the requirements of OCTG steel for sour service.

Although the above description describes flowforming for step two, other cold working, metal forming processes may be used instead of flowforming. For example, "drawing over a mandrel" and/or pilgering may also be used. Additionally, the bimetallic pipe can be made up of a myriad of combinations of materials, e.g., aluminum, titanium, zirconium, various nickel alloys, 300 series stainless, Nitronic, duplex stainless, non-magnetic stainless on the ID liners with clad low carbon steel, high carbon steel, or stainless ODs, or any combination thereof.

In addition, although the above description describes diffusion bonding for step one, other metal forming processes that adhere two materials together may be used instead of, or in addition to, the diffusion bonding. For example, hot extruding, cladding, rolling and fuse welding (without a weld filler) may be used to metallurgically combine the two materials together before the flowforming step. For instance, two plates may be rolled together and welded to form a tubular component and then cladded together to metallurgically bond the two materials together before the flowforming step. For the cladding process, the materials may be explosively cladded, laser deposition cladded, or diffusion bonding cladded. In this way, vastly different materials that typically have vastly different processing parameters may be formed into one, monolithic, clad workpiece with one set of processing parameters using embodiments of the present invention.

Although the above discussion discloses various exemplary embodiments of the invention, it should be apparent that those skilled in the art can make various modifications that will achieve some of the advantages of the invention without departing from the true scope of the invention.

What is claimed is:

1. A method of producing a bimetallic tubular component, the method comprising:
   providing a first tubular workpiece having an inner diameter and a second tubular workpiece having an outer diameter, the first and second tubular workpieces having dissimilar cold-working processing parameters, wherein the second tubular workpiece comprises a corrosion resistant alloy, wherein the first tubular workpiece comprises one of a duplex stainless steel and an aluminum alloy, wherein the first tubular workpiece has a hardness of 100 Vickers or greater, and wherein the second tubular workpiece has a hardness value greater than two times the hardness value of the first tubular workpiece;
   diffusion bonding the inner diameter of the first tubular workpiece to the outer diameter of the second tubular workpiece; and
   flowforming the diffusion bonded tubular workpieces to form the bimetallic tubular component without any heat treatment after the flowforming.

2. The method of claim 1, wherein the cold-working processing parameters are selected from the group consisting of feed rates, speed rates, and wall reduction percentages.

3. The method of claim 1, wherein the diffusion bonding is a hot isostatic pressing process.

4. The method of claim 3, wherein the hot isostatic pressing process is performed in an inert atmosphere.

5. The method of claim 1, wherein each tubular workpiece has an end and a gap is formed between the inner diameter and the outer diameter, the method further comprising:
   providing a port that goes through the first tubular workpiece to the gap between the two workpieces;
   sealing the end of the first tubular workpiece to the end of the second tubular workpiece in order to form a sealed area between the two workpieces; and
   forming a vacuum between the two workpieces in the gap before the diffusion bonding process.

6. The method of claim 1, wherein the second tubular workpiece comprises one of Alloy C-276 and Alloy 625.

7. The method of claim 1, wherein the diffusion bonded tubular workpieces are flowformed to a wall reduction of 20% to 31.7%.

* * * * *